(12) United States Patent
Tah et al.

(10) Patent No.: US 10,439,878 B1
(45) Date of Patent: Oct. 8, 2019

(54) PROCESS-BASED LOAD BALANCING AND FAILOVER POLICY IMPLEMENTATION IN STORAGE MULTI-PATH LAYER OF HOST DEVICE

(71) Applicant: EMC IP Holding Company LLC, Hopkinton, MA (US)

(72) Inventors: Arnab Tah, Bangalore (IN); Rimpesh Patel, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 5 days.

(21) Appl. No.: 15/993,703

(22) Filed: May 31, 2018

(51) Int. Cl.
| | |
|---|---|
| H04L 29/12 | (2006.01) |
| H04L 12/24 | (2006.01) |
| H04L 29/08 | (2006.01) |
| H04L 29/06 | (2006.01) |
| H04L 29/14 | (2006.01) |
| G06F 3/06 | (2006.01) |

(52) U.S. Cl.
CPC ...... *H04L 41/0893* (2013.01); *H04L 67/1034* (2013.01); *H04L 67/1097* (2013.01); *H04L 69/14* (2013.01); *H04L 69/18* (2013.01); *H04L 69/40* (2013.01)

(58) Field of Classification Search
USPC ............... 709/223, 228, 232, 230, 239, 250
See application file for complete search history.

(56) References Cited

U.S. PATENT DOCUMENTS

| | | | | |
|---|---|---|---|---|
| 4,953,162 | A | * | 8/1990 | Lyons ..................... H04L 12/28 370/245 |
| 5,546,549 | A | * | 8/1996 | Barrett .................. G06F 13/122 370/433 |
| 6,687,746 | B1 | | 2/2004 | Shuster et al. |
| 6,697,875 | B1 | | 2/2004 | Wilson |
| 7,454,437 | B1 | | 11/2008 | Lavallee et al. |
| 7,818,428 | B1 | | 10/2010 | Lavallee et al. |

(Continued)

OTHER PUBLICATIONS

VMWARE, "Multipathing Configuration for Software iSCSI Using Port Binding," Technical White Paper, Apr. 25, 2012, 15 pages.

(Continued)

*Primary Examiner* — Jude Jean Gilles
(74) *Attorney, Agent, or Firm* — Ryan, Mason & Lewis, LLP

(57) ABSTRACT

An apparatus in one embodiment comprises a host device configured to communicate over a network with a storage system comprising a plurality of storage devices. The host device includes a set of input-output queues and a multi-path input-output driver configured to select input-output operations from the set of input-output queues for delivery to the storage system. The multi-path input-output driver is further configured to detect at least first and second input-output operations from respective ones of at least first and second different processes executing on the host device, to assign a first policy identifier to the first input-output operation from the first process, and to assign a second policy identifier different than the first policy identifier to the second input-output operation from the second process. The input-output operations are queued in different ones of the queues of the set of input-output queues based at least in part on their respective assigned policy identifiers.

20 Claims, 4 Drawing Sheets

(56) References Cited

U.S. PATENT DOCUMENTS

| | | | |
|---|---|---|---|
| 7,925,872 B2 | 4/2011 | Lai et al. | |
| 9,098,466 B2* | 8/2015 | Barnes | G06F 11/20 |
| 9,594,780 B1 | 3/2017 | Esposito et al. | |
| 9,696,917 B1 | 7/2017 | Sareena et al. | |
| 9,778,852 B1 | 10/2017 | Marshak et al. | |
| 2004/0010563 A1 | 1/2004 | Forte et al. | |
| 2004/0172636 A1* | 9/2004 | Do | G06F 3/0613 |
| | | | 719/321 |
| 2008/0043973 A1 | 2/2008 | Lai et al. | |
| 2008/0140847 A1* | 6/2008 | Almog | H04L 29/12066 |
| | | | 709/228 |
| 2011/0197027 A1 | 8/2011 | Balasubramanian et al. | |
| 2012/0120848 A1* | 5/2012 | Hegde | H04L 69/162 |
| | | | 370/255 |
| 2016/0117113 A1 | 4/2016 | Li et al. | |

OTHER PUBLICATIONS

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

U.S. Appl. No. 15/795,653 filed in the name of Maneesh Pusalkar et al. Oct. 27, 2017 and entitled "Storage System with Network-Wide Configurable Device Names."

U.S. Appl. No. 15/849,828 filed in the name of Sanjib Mallick et al. Dec. 21, 2017 and entitled "Storage System with Input-Output Performance Control Utilizing Application Process Detection."

U.S. Appl. No. 15/966,210 filed in the name of Sanjib Mallick et al. Apr. 30, 2018 and entitled "Host Device Load Balancing Using Port Load Reported by Storage System."

\* cited by examiner

```
struct PowerPathIOReqPacket {
    unsigned int ptype,                          /*type of PowerPathIOReqPacket*/
    ...
    PowerPathIOReqPacket  *p_pNext;              /* Pointer to next PowerPathIOReqPacket */
    ...
    PowerPathIOReqPacket  *p_pPirpParent;        /* Pointer to parent PowerPathIOReqPacket */
    ...
    tid_t     thread_id;                         /* Thread id */
    ...
    unsigned int policy;                         /* process-based policy for load balancing and failover */
};
```

FIG. 4

PROCESS-BASED LOAD BALANCING AND FAILOVER POLICY IMPLEMENTATION IN STORAGE MULTI-PATH LAYER OF HOST DEVICE

FIELD

The field relates generally to information processing systems, and more particularly to storage in information processing systems.

BACKGROUND

A wide variety of different types of storage systems are known. For example, some storage systems are configured to include multiple storage tiers, with different ones of the tiers providing different levels of performance or other characteristics. In such storage systems, data may be moved from one tier to another within a given storage system based on access frequency of the data or other factors. These and other types of tiered or non-tiered storage systems may be shared by multiple host devices of a compute cluster. However, problems can arise in such arrangements when a host device attempts to implement policies relating to load balancing and/or failover. For example, host devices are often configured to establish load balancing and failover policies for different storage array types on a per storage array type basis. In such arrangements, it is difficult if not impossible for a host device to specify different policies relating to load balancing and/or failover for different applications utilizing a storage array of the particular type. Utilization of the same policy relating to load balancing and/or failover for all applications accessing a storage array of a given type may lead to sub-optimal performance for some or all of the applications that utilize the storage array.

SUMMARY

Illustrative embodiments of the present invention configure a storage multi-path layer of one or more host devices to implement per-process implementation of policy for load balancing and/or failover. The storage multi-path layer illustratively comprises at least one multi-path input-output (MPIO) driver configured to process input-output (IO) operations for delivery from a corresponding host device to the storage system. Some embodiments utilize an MPIO request packet format that includes one or more fields configured for specification of a particular policy for load balancing and/or failover on a per-process basis. A given "process" as the term is broadly used herein can comprise, for example, an entire application or a portion of a particular application that includes multiple distinct processes.

These and other embodiments overcome the problems that can otherwise result when a host device is configured to establish load balancing and/or failover policies only for different types of storage arrays. For example, illustrative embodiments can dynamically adapt the particular applied load balancing and failover policies to the particular processing needs of each application or other process, thereby providing significant performance enhancements across all applications.

In one embodiment, an apparatus comprises a host device configured to communicate over a network with a storage system comprising a plurality of storage devices. The host device includes a set of IO queues and an MPIO driver configured to select IO operations from the set of IO queues for delivery to the storage system. The MPIO driver is further configured to detect at least first and second IO operations from respective ones of at least first and second different processes executing on the host device, to assign a first policy identifier to the first IO operation from the first process, and to assign a second policy identifier different than the first policy identifier to the second IO operation from the second process. The IO operations are queued in different ones of the queues of the set of IO queues based at least in part on their respective assigned policy identifiers.

The first policy identifier illustratively specifies at least one of a first load balancing policy and a first failover policy for the first IO operation and the second policy identifier specifies at least one of a second load balancing policy and a second failover policy for the second IO operation, and wherein the second load balancing policy and the second failover policy are different than respective corresponding ones of the first load balancing policy and the first failover policy.

The storage system in some embodiments comprises a storage array having a particular logical unit type, and the first and second IO operations to which the MPIO driver assigns the different first and second policy identifiers are directed to the same storage array having the particular logical unit type.

The MPIO driver may be further configured to maintain at least one table that provides a mapping between process identifiers and respective corresponding policy identifiers.

In an arrangement of this type, assigning a given one of the policy identifiers to a given one of the IO operations illustratively comprises determining a process identifier for the given IO operation, accessing a mapping table to determine a policy identifier corresponding to the process identifier, and assigning the policy identifier to the given IO operation.

Additionally or alternatively, assigning a given one of the policy identifiers to a given one of the IO operations may further comprise forming at least one MPIO request packet based at least in part on the given IO operation, and inserting at least a portion of the given policy identifier into one or more fields of the MPIO request packet.

In some embodiments, the first and second IO operations are part of respective first and second subsets of a given set of IO operations directed to a particular logical unit of the storage system, and different load balancing and failover policies are applied to the first subset of IO operations than are applied to the second subset of IO operations. The set of IO queues illustratively comprises at least first and second different IO queues for use with respective ones of the first and second subsets of the given set of IO operations.

In some embodiments, IO operations assigned the first policy identifier are queued in a first one of the queues of the set of IO queues and IO operations assigned the second policy identifier are queued in a second one of the queues of the set of IO queues. The MPIO driver in such an embodiment may be configured to select the IO operations queued in the first queue in accordance with a first policy identified by the first policy identifier and to select the IO operations queued in the second queue in accordance with a second policy identified by the second policy identifier.

These and other illustrative embodiments include, without limitation, apparatus, systems, methods and computer program products comprising processor-readable storage media.

BRIEF DESCRIPTION OF THE DRAWINGS

FIG. 4 shows one possible example of an MPIO request packet format comprising one or more fields configured for specification of a particular policy for load balancing and/or failover on a per-process basis.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
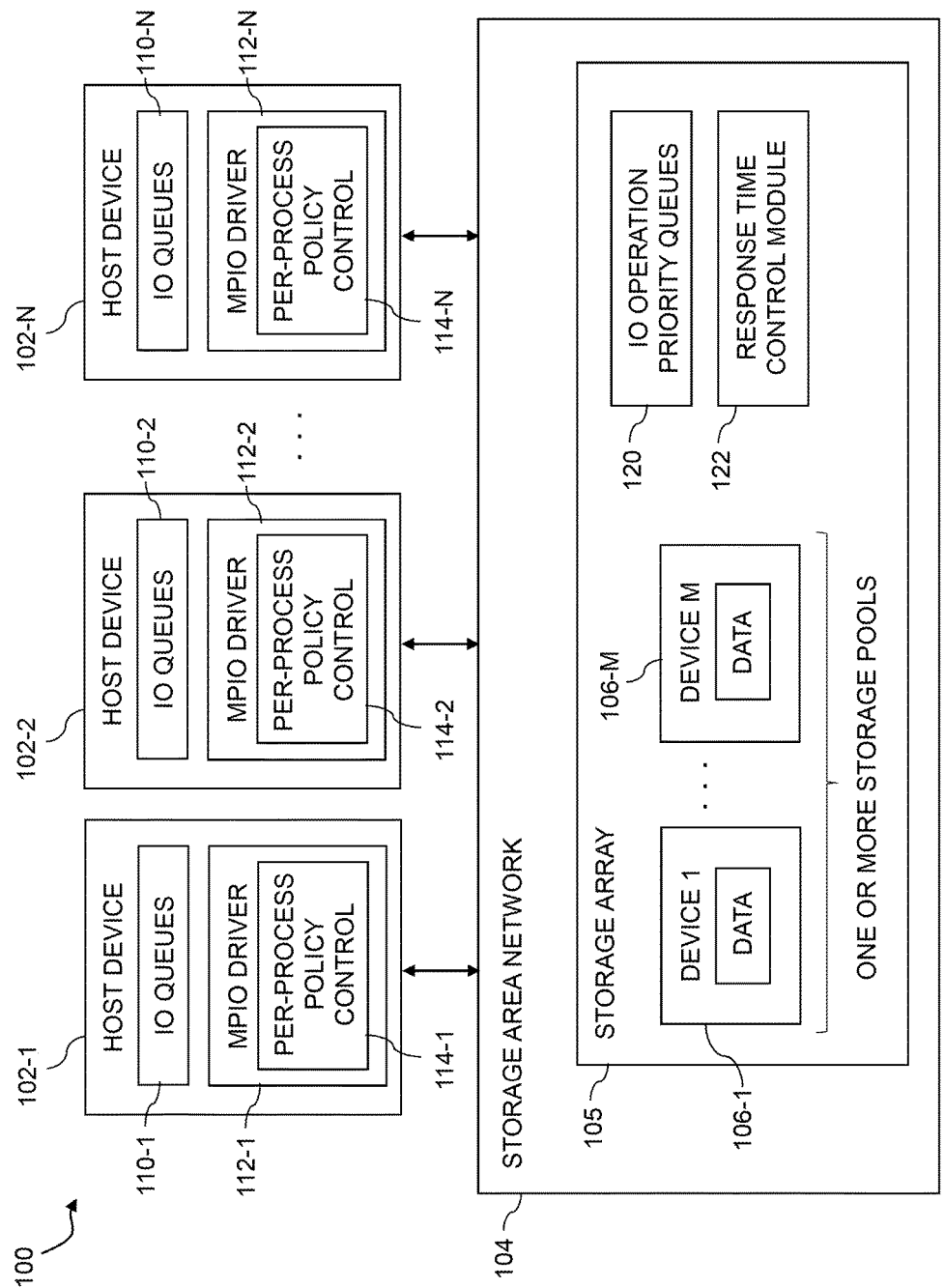
FIG. 1 is a block diagram of an information processing system configured with functionality for process-based load balancing and failover policy control utilizing a multi-path layer of a host device in an illustrative embodiment.

FIG. 1 shows an information processing system 100 configured in accordance with an illustrative embodiment. The information processing system 100 comprises a plurality of host devices 102-1, 102-2, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system."

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities. Compute services may be provided for users under a platform-as-a-service (PaaS) model, although it is to be appreciated that numerous other cloud infrastructure arrangements could be used.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN. A logical storage device can be defined in the storage array 105 to include different portions of one or more physical storage devices. Storage devices 106 may therefore be viewed as comprising respective LUNs or other logical storage devices.

Each of the host devices 102 may have multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1, 110-2, . . . 110-N and respective MPIO drivers 112-1, 112-2, . . . 112-N. The MPIO drivers 112 collectively comprise a multi-path layer of the host devices 102. The multi-path layer is also referred to herein as a "storage multi-path layer" as it supports multiple paths between a given one of the host devices 102 and the storage array 105. The multi-path layer provides functionality for per-process policy control using respective per-process policy control modules 114-1, 114-2, . . . 114-N implemented within the MPIO drivers 112.

The MPIO driver 112-1 is configured to select IO operations from its corresponding set of IO queues 110-1 for delivery to the storage array 105 over the SAN 104. The set of IO queues 110-1 illustratively comprises different queues configured in accordance with different policies for load balancing and/or failover. For example, different ones of the queues in the set of IO queues 110-1 can implement different load balancing and/or failover algorithms, or any of a number of other types of policy-based techniques, for selecting IO operations for delivery to the storage array 105. It should be noted in this regard that the selection of a given IO operation from a particular queue in the set of IO queues 110-1 may comprise selecting a corresponding MPIO request packet from that queue. An MPIO request packet may be viewed as an example of at least a portion of an IO operation as the latter term is broadly used herein.

The MPIO driver 112-1 is further configured to detect at least first and second IO operations from respective ones of at least first and second different processes executing on the host device 102-1, to assign a first policy identifier to the first IO operation from the first process, and to assign a second policy identifier different than the first policy identifier to the second IO operation from the second process.

The first and second processes may comprise, for example, different processes of a given application executing on the host device 102-1, different processes of respective different applications executing on the host device 102-1, or respective different applications executing on the host device 102-1. The term "process" as used herein is therefore intended to be broadly construed to encompass an entire application or a portion of an application. Other types of processes can be used.

Additional IO operations of respective other processes are each assigned distinct process-based policy identifiers in a similar manner. The IO operations are queued in different ones of the queues of the set of IO queues 110-1 based at least in part on their respective assigned policy identifiers.

The first policy identifier illustratively specifies at least one of a first load balancing policy and a first failover policy for the first IO operation and the second policy identifier illustratively specifies at least one of a second load balancing policy and a second failover policy for the second IO operation. The second load balancing policy and the second failover policy are different than respective corresponding ones of the first load balancing policy and the first failover policy. Additional distinct instances of load balancing and/or failover policies may be specified for other types of processes in a similar manner.

In some embodiments, the storage array 105 has a particular logical unit type and the first and second IO operations to which the MPIO driver 112-1 assigns the different first and second policy identifiers are both directed to the same storage array 105 having the particular logical unit type.

The MPIO driver 112-1 is further configured to maintain at least one table that provides a mapping between process identifiers and respective corresponding policy identifiers. The one or more mapping tables may be maintained in a persistent memory of the host device 102-1, such as a flash memory or other non-volatile memory. More particular examples of persistent memory that may be utilized to store the one or mapping tables in the host device include NAND-based flash memory or other types of non-volatile memory such as resistive RAM, phase change memory, spin torque transfer magneto-resistive RAM (STT-MRAM) and Intel Optane™ devices based on 3D XPoint™ memory.

In assigning a given one of the policy identifiers to a given one of the IO operations, the MPIO driver 112-1 first determines a process identifier for the given IO operation, then accesses the above-noted mapping table to determine a policy identifier corresponding to the process identifier, and finally assigns the policy identifier determined from the mapping table to the given IO operation. The latter assignment in some embodiments more particularly comprises forming at least one MPIO request packet based at least in part on the given IO operation, and inserting at least a portion of the given policy identifier into one or more fields of the MPIO request packet. It is to be appreciated, however, that alternative techniques may be used to assign policy identifiers to IO operations in other embodiments.

In some embodiments, the first and second IO operations are part of respective first and second subsets of a given set of IO operations directed to a particular logical unit of the storage array 105. The per-process policy control module 114-1 of MPIO driver 112-1 in such embodiments is advantageously configured to allow different load balancing and/or failover policies to be applied to the first subset of IO operations than are applied to the second subset of IO operations.

As noted above, the set of IO queues 110-1 illustratively comprises at least first and second different IO queues for use with respective ones of the first and second subsets of the given set of IO operations.

Accordingly, IO operations assigned the first policy identifier are illustratively queued under the control of the MPIO driver 112-1 in a first one of the queues of the set of IO queues 110-1 and IO operations assigned the second policy identifier are queued in a second one of the queues of the set of IO queues 110-1. Other IO operations assigned different process-based policy identifiers may be similarly queued in other different queues of the set of IO queues 110-1 so as to facilitate implementation of the corresponding policies, for example, via utilization of different load balancing and/or failover algorithms for respective different ones of the queues, or respective different subsets of queues, in the set of IO queues 110-1. As noted above, selection of an IO operation from a queue may more particularly comprise selection of one or more corresponding MPIO request packets from the queue.

The MPIO driver 112-1 may therefore be configured to select the IO operations queued in the first queue in accordance with a first policy identified by the first policy identifier and to select the IO operations queued in the second queue in accordance with a second policy identified by the second policy identifier. Other IO operations queued in other ones of the queues in the set of queues 110-1 may be similarly selected for delivery to the storage array 105 in accordance with their respective distinct policies.

As a more particular example, the first process executing on the host device 102-1 may comprise an application that is extremely sensitive to delays in response time but has a high tolerance for failure, while the second process executing on the host device 102-1 is extremely sensitive to failure but has a high tolerance for delays in response time. In such an arrangement, the load balancing and failover policies applied to IO operations of the first process may specify a more aggressive load balancing algorithm that assesses multiple available paths to obtain a fastest possible path for a given IO operation, while also specifying a less aggressive failover algorithm that has a relatively small number of retries. By way of contrast, the load balancing and failover policies applied to IO operations of the second process may specify a less aggressive load balancing algorithm that does not necessarily obtain a fastest possible path for a given IO operation, while also specifying a more aggressive failover algorithm that includes a relatively large number of retries.

A wide variety of other load balancing and/or failover algorithms may be utilized in other embodiments. For example, various types of load balancing and/or failover algorithms utilized in conventional implementations of MPIO drivers may be triggered on a per-process basis using the techniques disclosed herein.

The per-process policy control functionality of the module 114-1 of MPIO driver 112-1 can provide improved performance in the presence of the above-described and numerous other differences that may arise in the particular needs of applications or other processes, relative to utilization of a global policy requirement per type of storage array.

These and other functions of the MPIO driver 112-1 are carried out at least in part under the control of its per-process policy control module 114-1. For example, the per-process policy control module 114-1 is illustratively configured to control performance of the steps of the flow diagram to be described below in conjunction with FIG. 2.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105. The MPIO drivers 112 of such other host devices are each similarly configured to select IO operations from its corresponding one of the sets of IO queues 110 for delivery to the storage array 105 over the SAN 104, in accordance with per-process policy control functionality provided by its corresponding one of the modules 114.

The MPIO drivers 112 may comprise otherwise conventional MPIO drivers, such as PowerPath drivers from Dell EMC, suitably modified in the manner disclosed herein to perform per-process policy control. Such functionality can be similarly implemented in numerous other types of existing storage multi-path layer devices and components, including operating system based multi-path drivers.

Additional details regarding examples of MPIO drivers that may be adapted for use in illustrative embodiments are provided in U.S. Pat. No. 9,696,917, entitled "Method and Apparatus for Efficiently Updating Disk Geometry with Multipathing Software," which is incorporated by reference herein.

The storage array 105 in some embodiments also comprises a persistent memory that is implemented in the form of a flash memory or other type of non-volatile memory. The persistent memory is assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

As noted above, commands used by the host devices 102 to communicate with the storage array 105 illustratively comprise SCSI commands, although as noted above other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein.

Again, functionality described above in the context of the first MPIO driver 112-1 may be similarly performed by each of the other MPIO drivers 112-2 through 112-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support performance of per-process policy control.

As indicated previously, absent use of the per-process policy control techniques in an MPIO layer disclosed herein, it can be difficult if not impossible for a host device such as host device 102-1 to specify different policies relating to load balancing and/or failover for different applications utilizing a storage array of a given type. Utilization of the same policy relating to load balancing and/or failover for all applications accessing a storage array of a given type is undesirable, as it may lead to sub-optimal performance for some or all of the applications that utilize the storage array.

Such drawbacks are advantageously overcome in illustrative embodiments herein by utilization of an MPIO layer comprising one or more of the MPIO drivers 112 to perform per-process policy control as described above in conjunction with selection of IO operations from the sets of IO queues 110 of the host devices 102. For example, illustrative embodiments can dynamically adapt the particular applied load balancing and/or failover policies to the particular processing needs of each application or other process, thereby providing significant performance enhancements across all applications.

The storage array 105 in the present embodiment comprises additional components such as IO operation priority queues 120 and response time control module 122. The response time control module 122 may be used to implement storage array based adjustments in response time for particular IO operations based at least in part on service level objective (SLO) information stored by the storage array 105 in its persistent memory. The response time control module 122 operates in conjunction with the IO operation priority queues 120.

The storage array 105 utilizes its IO operation priority queues 120 to provide different levels of performance for IO operations. For example, the IO operation priority queues 120 may have respective different priority levels. The storage array 105 may be configured to provide different priority levels for different ones of the IO operations by assigning different ones of the IO operations to different ones of the IO operation priority queues 120. The IO operation priority queues 120 are illustratively associated with respective SLOs for processing of IO operations in the storage array 105.

As mentioned above, communications between the host devices 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage array 105 may additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, disk drives, flash drives, solid-state drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array suitably reconfigured to implement per-process policy control in an MPIO layer as disclosed herein.

For example, the storage array 105 may comprise one or more storage arrays such as VNX®, Symmetrix VMAX® and Unity™ storage arrays, commercially available from Dell EMC. Other types of storage products that can be used in implementing a given storage system in illustrative embodiments include software-defined storage products such as ScaleIO™, cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, MPIO drivers 112 and per-process policy control modules 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be further described with reference to the flow diagram of the illustrative embodiment of FIG. 2. The process as shown includes steps 200 through 208, and is suitable for use in the system 100 but is more generally applicable to other types of systems comprising one or more host devices and a storage system. The storage system in this embodiment is assumed to comprise at least one storage array having a plurality of storage devices.

Figure 2:
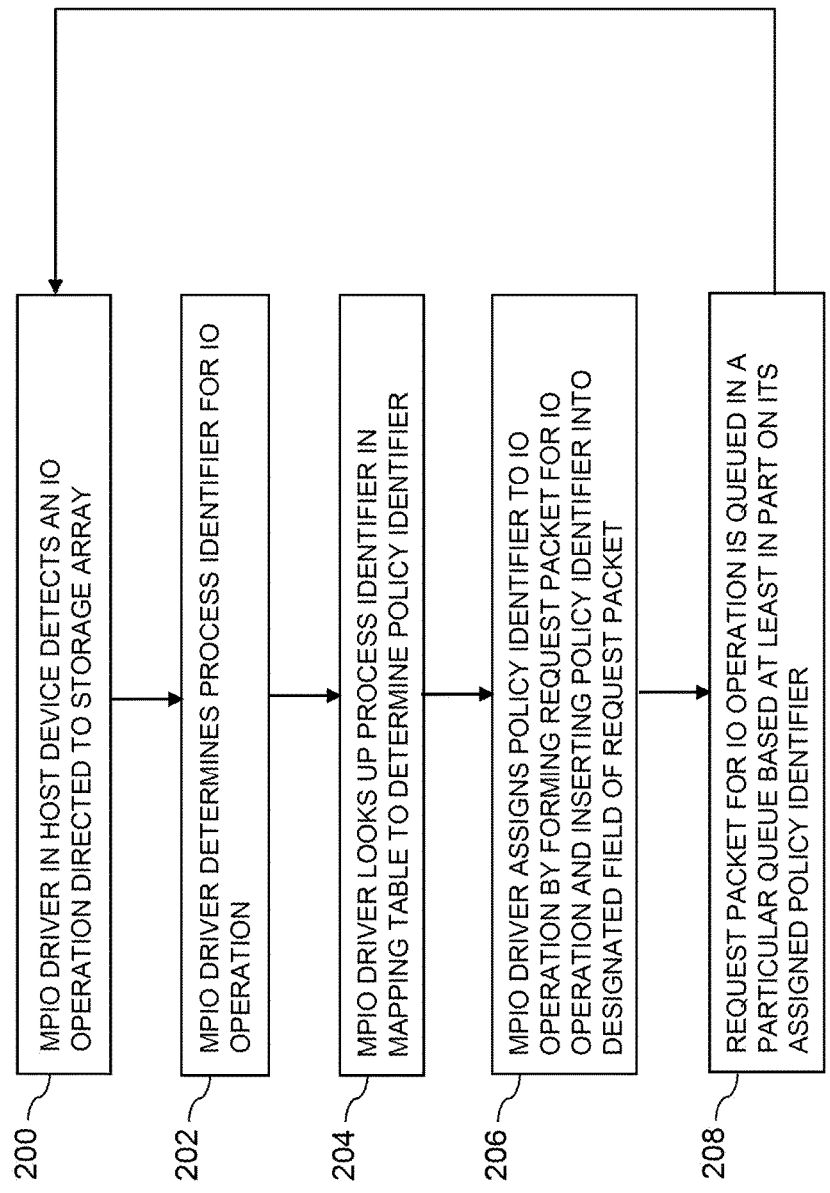
FIG. 2 is a flow diagram showing one possible example of process-based load balancing and failover policy control utilizing a multi-path layer of a host device in an illustrative embodiment.

The steps of the FIG. 2 process are illustratively performed primarily by or under the control of an MPIO driver of a given host device, although other arrangements of system components can perform at least portions of one or more of the steps in other embodiments. This embodiment further assumes that the assigned policy identifiers each specify at least one of a load balancing policy and a failover policy, although other types of policies can be controlled using per-process policy control functionality as disclosed herein.

In step 200, an MPIO driver of a given host device detects an IO operation directed to a storage array. The IO operation may comprise, for example, a read operation or a write operation directed to a LUN of the storage array. The IO operation is associated with a particular process, such as an application executing on the given host device or a particular portion of such an executing application.

In step 202, the MPIO driver determines a process identifier for the IO operation.

In step 204, the MPIO driver looks up the process identifier in a mapping table to determine a policy identifier that corresponds to that particular process identifier.

In step 206, the MPIO driver assigns the policy identifier determined in step 204 to the IO operation by forming a request packet for the IO operation and inserting the policy identifier into a designated field of the request packet.

In step 208, the request packet for the IO operation is queued in a particular queue based at least in part on its assigned policy identifier. The process then returns to step 200 to handle additional IO operations in the manner described above.

As mentioned previously, the host device in some embodiments comprises a set of IO queues with different load balancing and/or failover algorithms applied for different individual ones of the queues or for other different subsets of the queues. The FIG. 2 process therefore allows different subsets of IO operations, directed by respective different applications or other processes to a given LUN or set of LUNs of the storage array, to be subject to different load balancing and/or failover policies, or possibly additional or alternative policies. This is illustratively achieved by determining the process identifier for each IO operation, translating the process identifier to at least one policy identifier via the mapping table, assigning the policy identifier to the IO operation, and queuing the IO operation in a particular one of the queues or subsets of queues based at least in part on its assigned policy identifier. Dispatching of the IO operations from the queues is controlled by the MPIO driver in accordance with the particular load balancing and/or failover algorithms of those queues.

Multiple additional instances of the FIG. 2 process are assumed to be performed in respective additional host devices that share the storage array.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and per-process policy control functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different per-process policy control arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Additional illustrative embodiments configured to perform per-process policy control in an MPIO layer of a host device will now be described with reference to FIGS. 3 and 4. It is assumed in this embodiment that the MPIO driver of a given host device provides per-process policy control functionality in conjunction with selection of IO operations from a set of IO queues for delivery to a storage array, under the control of a corresponding per-process policy control module implemented in the MPIO driver.

Figure 3:
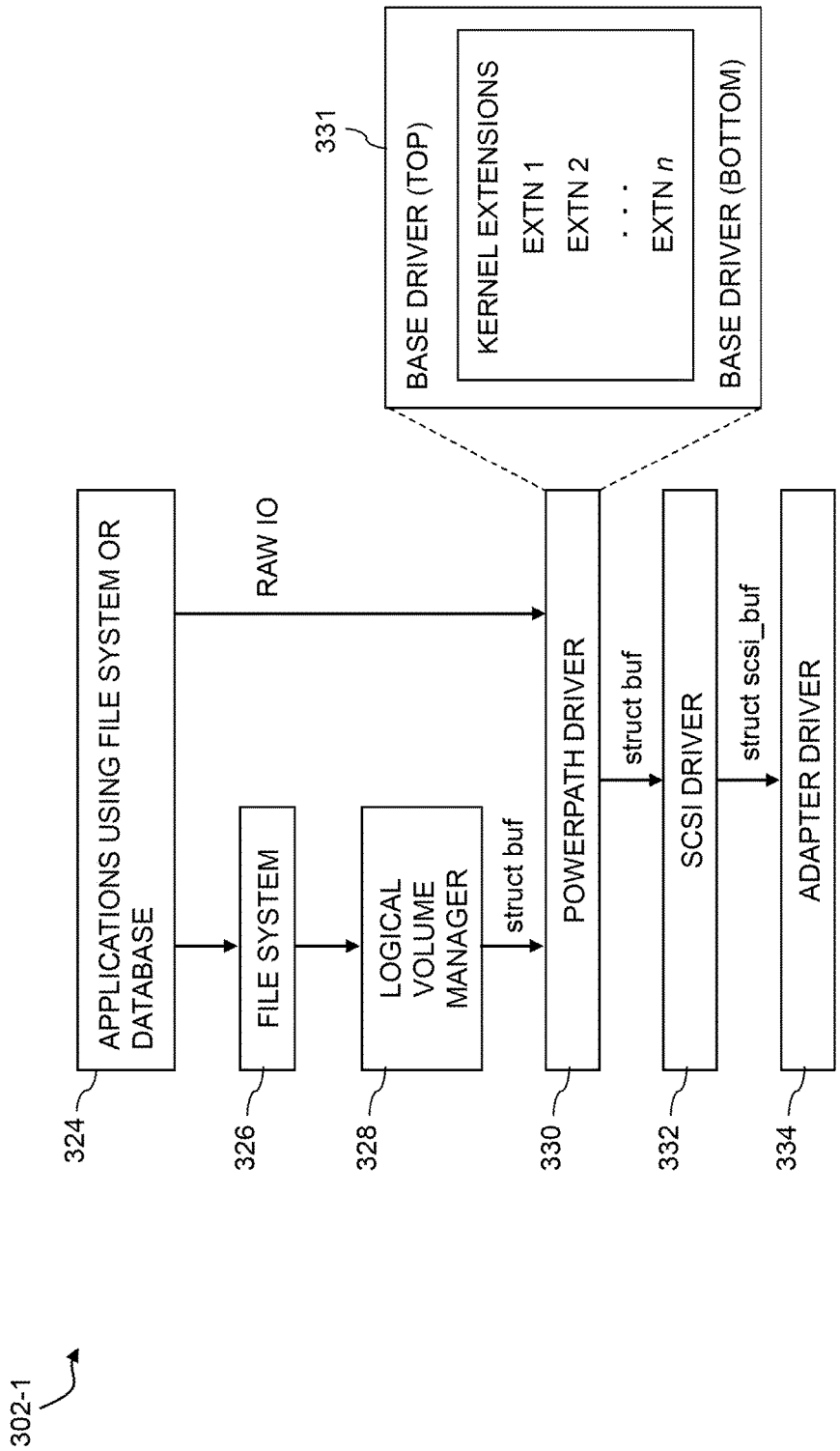
FIG. 3 is a block diagram showing a more detailed view of a portion of a host device implementing process-based load balancing and failover policy control functionality in an illustrative embodiment.

FIG. 3 shows a portion of a host device 302-1 implementing process-based load balancing and failover policy control functionality in an illustrative embodiment. It is assumed that the host device 302-1 is configured to communicate over a network such as SAN 104 with a storage system such as storage array 105, although the network and storage system are not explicitly shown in this figure.

The host device 302-1 runs applications 324 on behalf of one or more system users. Each such application comprises one or more processes for which policy control is implemented on a per-process basis. One or more of the applications 324 each utilize a file system 326 that accesses a logical volume manager (LVM) 328. The LVM 328 provides a first stream of IO operations to an MPIO driver 330, illustratively implemented as a PowerPath driver suitably modified to provide per-process policy control functionality as disclosed herein. Additionally or alternatively, one or more of the applications 324 each provides raw IO in the form of a second stream of IO operations directly to the MPIO driver 330. The raw IO is illustratively directed to a database of the storage system via the MPIO driver 330.

The MPIO driver 330 in this embodiment has a layered architecture 331 that includes a base driver having top and bottom sections. The layered architecture 331 in this embodiment further comprises multiple kernel extensions EXTN 1, EXTN 2, . . . EXTN n which are arranged between the top and bottom sections of the base driver as shown. The kernel extensions in the PowerPath context may be implemented as respective pluggable modules of the layered architecture 331.

A given one of the kernel extensions illustratively comprises a MultiPathing Extension (MPX) configured to provide functionality for load balancing, automatic path failover and intelligent path management. Other examples of possible kernel extensions in illustrative embodiments include a Data Migration (DM) extension configured to provide functionality for data migration from one LUN to another, and a General Purpose Extension (GPE) configured to allow other software layers of the host device 302-1 to access the PowerPath kernel extension stack in order to obtain services or other benefits provided by PowerPath.

The top section of the base driver in MPIO driver 330 serves as the entry point to the MPIO driver 330 in this embodiment, exposing open, close, read, write, strategy and other entry points for the MPIO driver 330.

The bottom section of the base driver in the MPIO driver 330 passes down the IO operations to an underlying SCSI driver 332, illustratively by calling a strategy routine of the SCSI driver 332.

The base driver in the MPIO driver 330 also performs additional operations, such as reservation handing for SAN devices.

The MPIO driver 330 illustratively receives IO operations from the LVM 328 in accordance with a particular format, referred to as a "struct buf" format, which denotes a type of operating system block level format. The MPIO driver 330 also utilizes that same format for the raw IO.

IO operations selected by the MPIO driver 330 for delivery to the storage system are illustratively provided in the "struct buf" format to the SCSI driver 332, which in turn provides the IO operations to an adapter driver 334 in a "struct scsi_buf" format. The adapter driver 334 is illustratively implemented as a host bus adapter (HBA) driver configured to interface the host device 302-1 to the storage system.

The MPIO driver 330 is illustratively configured to determine a process identifier for a given IO operation received via the LVM 328 or as part of the raw IO, to access a mapping table to determine a policy identifier corresponding to the process identifier, and to assign the policy identifier to the given IO operation. Assigning the policy identifier to the given IO operation in this embodiment more particularly comprises forming at least one MPIO request packet based at least in part on the given 10 and inserting at least a portion of the given policy identifier into one or more fields of the MPIO packet.

More particularly, the MPIO driver 330 in this embodiment is configured to create a wrapper structure around the "struct buf" format. In the case of a PowerPath driver, which is assumed for the present embodiment, the wrapper structure comprises a PowerPath 10 request packet ("pirp") that is modified to include an additional field, with the additional field supporting the above-described insertion of the given policy identifier. This modified "pirp" is an example of what is more generally referred to herein as an MPIO packet.

FIG. 4 illustrates an example of the modified "pirp" format in more detail. The format in this example identifies a particular PowerPath 10 request packet, and includes a pointer ("p_pNext") to a next PowerPath IO request packet, a pointer ("p_pPirpParent") to a parent PowerPath IO request packet, a thread identifier ("thread_id"), and a policy field configured to identify at least one policy for load balancing and/or failover.

In this embodiment, the MPIO driver 330 illustratively determines the process identifier for a given IO operation by utilizing an appropriate kernel service for the corresponding operating system. The MPIO driver 330 maintains the above-noted mapping table that provides a mapping between a plurality of process identifiers and respective policy identifier instances each identifying one or more policies, such as load balancing, failover policies, and/or other policies to be applied to IO operations from the corresponding process. The above-noted policy field may therefore specify a single policy or a set of multiple policies. The MPIO driver 330 utilizes the mapping table to determine the policy identifier that is assigned to each IO operation from the corresponding process.

The term "policy identifier" as used herein is intended to be broadly construed, and may comprise different portions each identifying one of a plurality of different policies of a different type. For example, the policy identifier in some embodiments may comprise first and second portions, with the first portion identifying a particular one of a plurality of available load balancing policies each corresponding to a different load balancing algorithm, and the second portion identifying a particular one of a plurality of available failover policies each corresponding to a different failover algorithm. Additional or alternative policies may be specified by the policy identifier in a similar manner.

It is to be appreciated that numerous other MPIO request packet formats may be used, each comprising one or more fields configured for specification of a particular policy for load balancing and/or failover on a per-process basis.

In some embodiments, the mapping information utilized by the MPIO driver 330 to populate the mapping table can be passed down from user space of the host device 302-1 to the MPIO driver 330 using an existing IO control ("ioctl") interface. For example, the user space of the host device 302-1 may maintain a user-configurable file for storing the mapping information, and a user-space utility can be used in conjunction with the IO control interface to supply the mapping information to the MPIO driver 330. The mapping information itself can be in the form of a table, or can be used to populate a table.

As indicated previously, other MPIO drivers in other host devices of an information processing system may be configured in a manner similar to that described above for host device 302-1 in the FIG. 3 embodiment.

Again, it is to be appreciated that the particular per-process policy control arrangements described above are presented by way of illustrative example only. Numerous alternative arrangements of these and other features can be used in implementing other illustrative embodiments.

The illustrative embodiments disclosed herein can provide a number of significant advantages relative to conventional arrangements.

For example, some embodiments provide per-process policy control utilizing a multi-path layer of one or more host devices, operating in cooperation with a shared storage array or other type of storage system. The storage multi-path layer illustratively comprises at least one MPIO driver configured to process IO operations for delivery from a corresponding host device to the storage system. The MPIO driver may utilize an MPIO request packet format that includes one or more fields configured for specification of a particular policy for load balancing and/or failover on a per-process basis.

Such arrangements overcome the problems that can otherwise result when a host device is configured to establish load balancing and/or failover policies only for different types of storage arrays. For example, illustrative embodiments do not require all applications or other processes directed to a particular type of storage array to utilize the same load balancing and/or failover policies.

Illustrative embodiments allow an MPIO driver to determine different policies for application to IO operations from different processes, even though the IO operations are all directed to the same storage array of a particular type. As a result, there is no need to utilize a global policy for all applications utilizing the same type of storage array.

For example, the MPIO driver can dynamically adapt the particular load balancing and/or failover policies, as well as additional or alternative types of policies, to IO operations from different processes.

As a result, illustrative embodiments can better adapt the applied policies to the particular processing needs of each application or other process, thereby providing significant performance enhancements across all applications.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments of the invention. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers of a given one of the host devices are implemented as respective Linux control groups ("cgroups") or other kernel control groups utilizing operating system level virtualization of the host device.

The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the per-process policy control modules 114 may be implemented at least in part in software, as indicated previously herein.

It should again be emphasized that the above-described embodiments of the invention are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, control modules and additional or alternative components. Also, the particular configurations of system and device elements and associated processing operations illustratively shown in the drawings can be varied in other embodiments. For example, a wide variety of different MPIO driver configurations and associated per-process policy control arrangements can be used in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
    a host device configured to communicate over a network with a storage system comprising a plurality of storage devices;
    the host device comprising:
    a set of input-output queues; and
    a multi-path input-output driver configured to select input-output operations from the set of input-output queues for delivery to the storage system over the network;
    wherein the multi-path input-output driver is further configured:
        to detect at least first and second input-output operations from respective ones of at least first and second different processes executing on the host device;
        to assign a first policy identifier to the first input-output operation from the first process; and
        to assign a second policy identifier different than the first policy identifier to the second input-output operation from the second process;
    wherein the input-output operations are queued in different ones of the queues of the set of input-output queues based at least in part on their respective assigned policy identifiers.

2. The apparatus of claim 1 further comprising one or more additional host devices each configured to communicate over the network with the storage system and wherein each additional host device comprises a set of input-output queues and a multi-path input-output driver configured to select input-output operations from the set of input-output queues for delivery to the storage system over the network.

3. The apparatus of claim 1 wherein the first policy identifier specifies at least one of a first load balancing policy and a first failover policy for the first input-output operation and the second policy identifier specifies at least one of a second load balancing policy and a second failover policy for the second input-output operation, and wherein the second load balancing policy and the second failover policy are different than respective corresponding ones of the first load balancing policy and the first failover policy.

4. The apparatus of claim 1 wherein the first and second processes comprise different processes of a given application executing on the host device.

5. The apparatus of claim 1 wherein the first and second processes comprise different processes of respective different applications executing on the host device.

6. The apparatus of claim 1 wherein the first and second processes comprise respective different applications executing on the host device.

7. The apparatus of claim 1 wherein the storage system comprises a storage array having a particular logical unit type and the first and second input-output operations to which the multi-path input-output driver assigns the different first and second policy identifiers are directed to the same storage array having the particular logical unit type.

8. The apparatus of claim 1 wherein the multi-path input-output driver is further configured to maintain at least one table that provides a mapping between process identifiers and respective corresponding policy identifiers.

9. The apparatus of claim 1 wherein assigning a given one of the policy identifiers to a given one of the input-output operations comprises:
    determining a process identifier for the given input-output operation;
    accessing a mapping table to determine a policy identifier corresponding to the process identifier; and
    assigning the policy identifier to the given input-output operation.

10. The apparatus of claim 1 wherein assigning a given one of the policy identifiers to a given one of the input-output operations comprises:
    forming at least one multi-path input-output request packet based at least in part on the given input-output operation; and
    inserting at least a portion of the given policy identifier into one or more fields of the multi-path input-output request packet.

11. The apparatus of claim 1 wherein the first and second input-output operations are part of respective first and second subsets of a given set of input-output operations directed to a particular logical unit of the storage system and wherein different load balancing and failover policies are applied to the first subset of input-output operations than are applied to the second subset of input-output operations.

12. The apparatus of claim 11 wherein the set of input-output queues comprises at least first and second different input-output queues for use with respective ones of the first and second subsets of the given set of input-output operations.

13. The apparatus of claim 1 wherein input-output operations assigned the first policy identifier are queued in a first one of the queues of the set of input-output queues and input-output operations assigned the second policy identifier are queued in a second one of the queues of the set of input-output queues.

14. The apparatus of claim 13 wherein the multi-path input-output driver is configured to select the input-output operations queued in the first queue in accordance with a first policy identified by the first policy identifier and to select the input-output operations queued in the second queue in accordance with a second policy identified by the second policy identifier.

15. A method comprising:
    configuring a multi-path input-output driver of a host device to select input-output operations from a set of input-output queues of the host device for delivery to a storage system over a network;
    wherein the multi-path input-output driver performs the following steps:
    detecting at least first and second input-output operations from respective ones of at least first and second different processes executing on the host device;
    assigning a first policy identifier to the first input-output operation from the first process; and
    assigning a second policy identifier different than the first policy identifier to the second input-output operation from the second process;
    wherein the input-output operations are queued in different ones of the queues of the set of input-output queues based at least in part on their respective assigned policy identifiers.

16. The method of claim 15 wherein assigning a given one of the policy identifiers to a given one of the input-output operations comprises:
    determining a process identifier for the given input-output operation;

accessing a mapping table to determine a policy identifier corresponding to the process identifier; and assigning the policy identifier to the given input-output operation.

17. The method of claim 15 wherein assigning a given one of the policy identifiers to a given one of the input-output operations comprises:

forming at least one multi-path input-output request packet based at least in part on the given input-output operation; and inserting at least a portion of the given policy identifier into one or more fields of the multi-path input-output request packet.

18. A computer program product comprising a non-transitory processor-readable storage medium having stored therein program code of one or more software programs, wherein the program code, when executed by a host device comprising a multi-path input-output driver and a set of input-output queues, the host device being configured to communicate over a network with a storage system, causes the multi-path input-output driver:

to detect at least first and second input-output operations from respective ones of at least first and second different processes executing on the host device;

to assign a first policy identifier to the first input-output operation from the first process; and to assign a second policy identifier different than the first policy identifier to the second input-output operation from the second process;

wherein the input-output operations are queued in different ones of the queues of the set of input-output queues based at least in part on their respective assigned policy identifiers.

19. The computer program product of claim 18 wherein assigning a given one of the policy identifiers to a given one of the input-output operations comprises:

determining a process identifier for the given input-output operation;

accessing a mapping table to determine a policy identifier corresponding to the process identifier; and assigning the policy identifier to the given input-output operation.

20. The computer program product of claim 18 wherein assigning a given one of the policy identifiers to a given one of the input-output operations comprises:

forming at least one multi-path input-output request packet based at least in part on the given input-output operation; and inserting at least a portion of the given policy identifier into one or more fields of the multi-path input-output request packet.

* * * * *